June 13, 1933. E. E. McCOLLUM 1,913,403
GEAR MECHANISM
Filed Feb. 11, 1931 3 Sheets-Sheet 1

Inventor:
Earl E. McCollum
By Brown, Jackson, Boettcher & Dienner
Attys.

June 13, 1933. E. E. McCOLLUM 1,913,403
GEAR MECHANISM
Filed Feb. 11, 1931 3 Sheets-Sheet 3

Inventor:
Earl E. McCollum
By Jackson, Boettcher & Dienner
Attys.

Patented June 13, 1933

1,913,403

UNITED STATES PATENT OFFICE

EARL E. McCOLLUM, OF DOWNERS GROVE, ILLINOIS, ASSIGNOR TO McCOLLUM HOIST & MFG. CO., OF DOWNERS GROVE, ILLINOIS, A CORPORATION OF ILLINOIS

GEAR MECHANISM

Application filed February 11, 1931. Serial No. 514,925.

This invention relates to speed changing mechanisms and more particularly to a speed changing mechanism suitable for a hoist.

It is a general object of the present invention to provide a novel and improved form of hoisting mechanism. More particularly it is an object of the invention to provide, in a hoist mechanism, a novel arrangement of pulleys, shafts and gearing to provide a strong, compact, efficient and relatively inexpensive device.

Another object of the invention consists in providing a device in which friction is reduced to a minimum, in which the load is divided between several trains of gearing, and in which certain undesirable loads or forces are balanced by loads or forces acting in the opposite direction. This object is preferably attained by the provision and utilization of a number of new and novel features including a balanced worm drive and a balanced bevel gear drive.

Another object of the invention is to provide a hoist in which a worm gear is used at the high speed end of the train of gears.

Another object of the invention is to provide a hoist in which the high speed or prime mover end of the gearing is adjacent to and preferably coaxial with the low speed or driven element.

Another object is to provide, in a device of this sort, a gear train including a worm drive and a bevel gear drive between the drive member and the driven member, arranged to permit the use of the worm gear drive and at the same time permitting coaxial disposition of the drive and driven members.

Another object is to arrange both a worm wheel drive and a spur gear drive between the prime mover and the driven element and to dispose the worm wheel drive operatively between the prime mover and the spur gear drive.

Another object of the invention is to provide a device in which the train or trains of gearing are located symmetrically about a longitudinally extending drive shaft, to provide a so-called "straight line" system of gearing for a hoist mechanism.

A still further object of the invention is to provide a device in which the load sheave or drum is near the center of gravity of the hoist.

An important feature of the invention resides in the provision of a plurality of trains of gearing in parallel arrangement between the drive member and the driven member.

Another important feature of the invention resides in the provision of a hoist mechanism in which the drive sheave is located beside the hoisting sheave thereby resulting in a compact unit having the load sheave close to the center of gravity of the hoist.

Other and further features of the invention will be more apparent to those skilled in the art upon a consideration of the accompanying drawings and following specification, wherein is disclosed a single exemplary embodiment of the invention with the understanding, however, that such changes may be made therein as fall within the scope of the appended claims without departing from the spirit of the invention.

Figure 1:
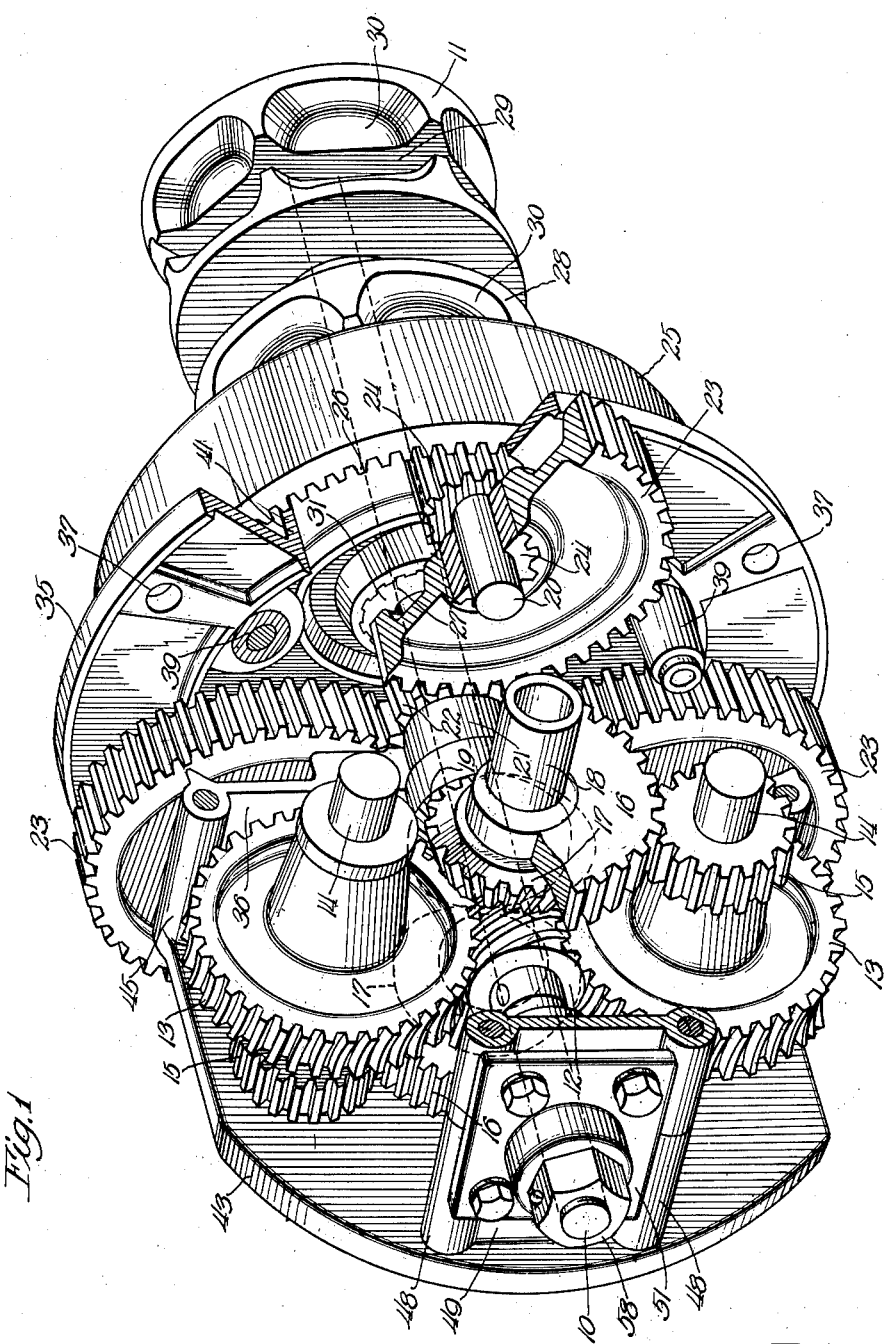
Figure 1 is a view in perspective of a hoist mechanism built acording to the invention. The cover of the device has been removed in order to better illustrate the mechanism, and portions of the mechanism have been broken away to show the mechanism lying behind the broken away portions.
Figure 2:
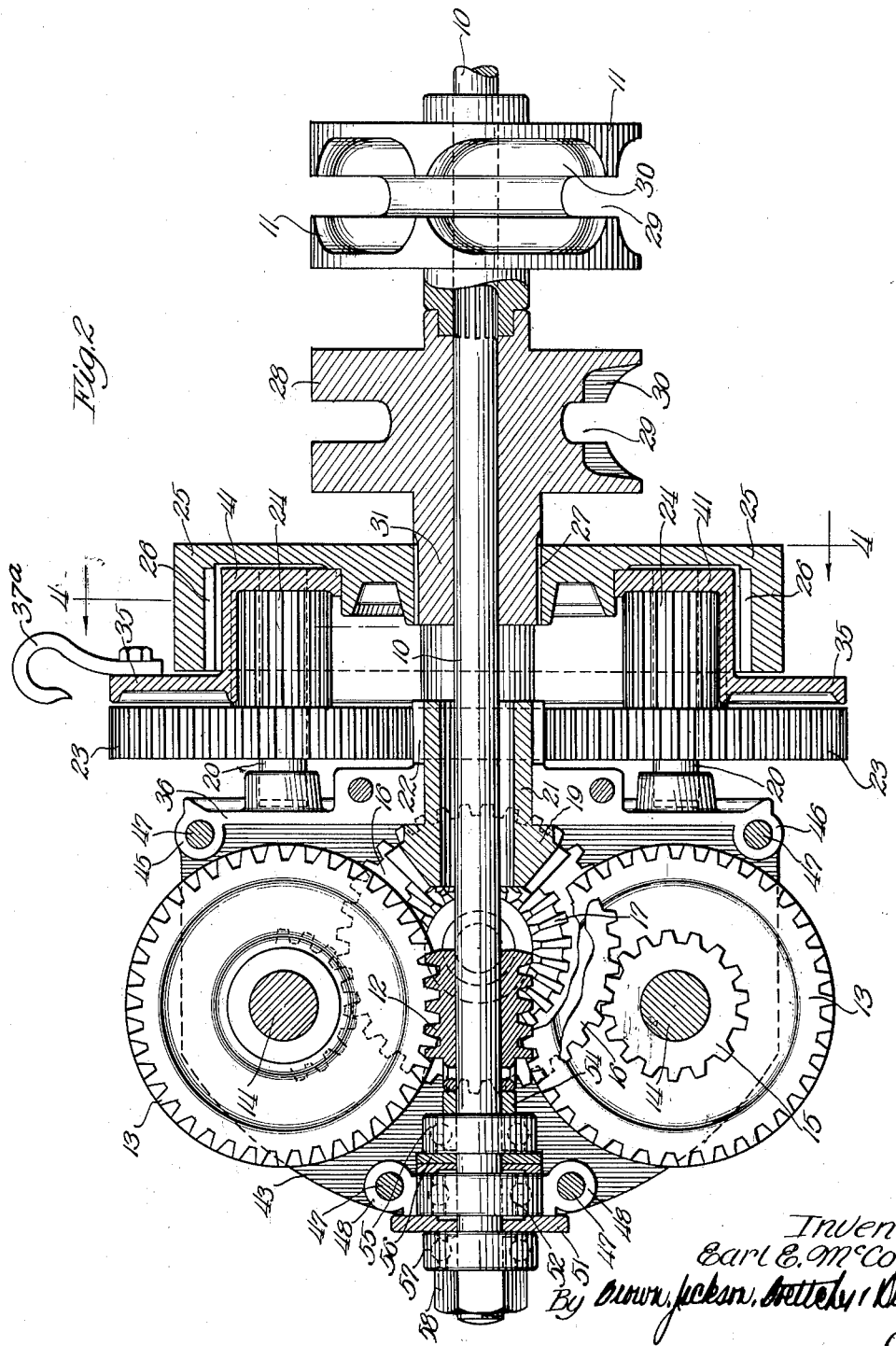
Figure 2 is a view, partly in side elevation and partly in section of the hoist mechanism shown in Figure 1.
Figure 3:
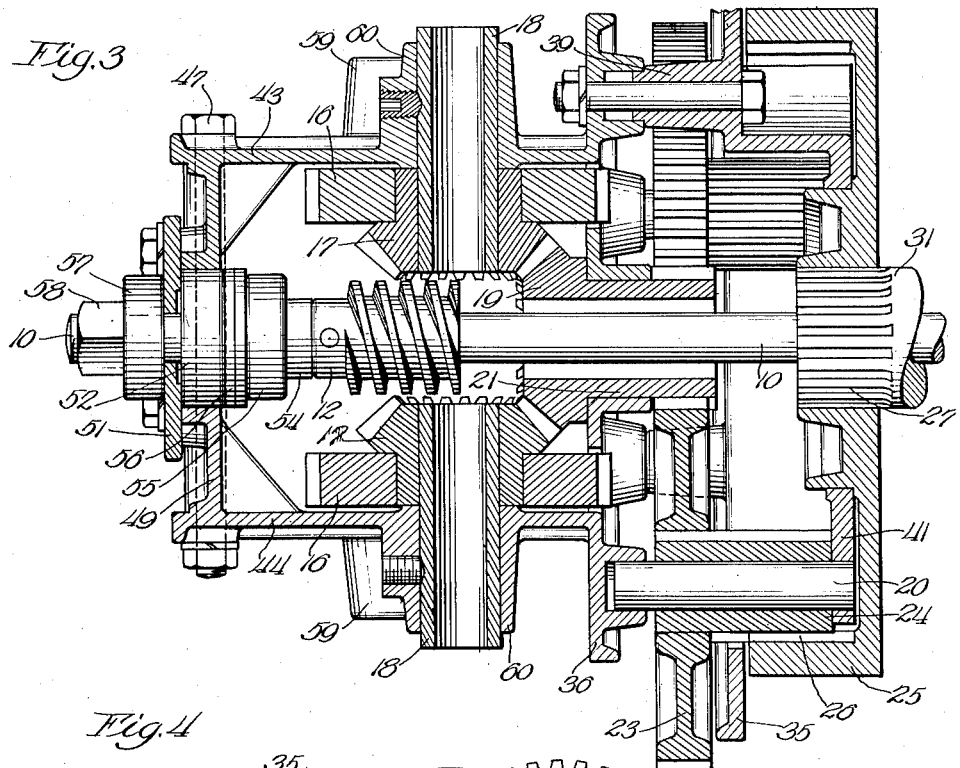
Figure 3 is a top plan view of the gearing of the hoist mechanism shown partly in a plan view and partly in section.
Figure 4:
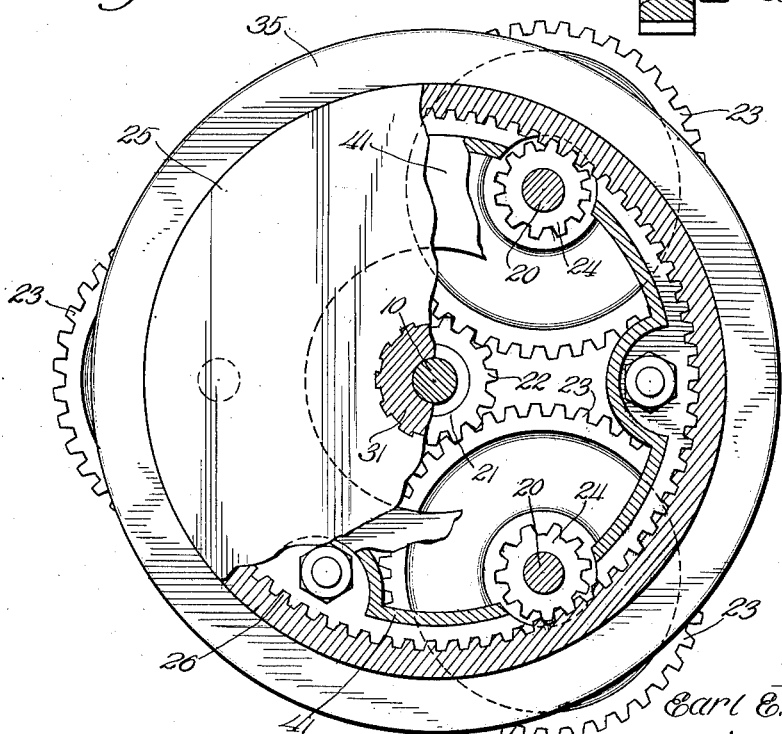
Figure 4 is a view partly in elevation and partly in section taken along the line 4—4 of Figure 2.

The invention, in the embodiment shown, consists essentially of a rotatably mounted shaft extending longitudinally of the hoist and a second shaft rotatably and substantially coaxially mounted with respect to the first shaft, one of the shafts being the drive shaft and one the driven shaft and a gear train operatively connected between the two shafts. The gear train preferably consists of a worm on the drive shaft which transfers a rotary motion about the longitudinal axis into rotary motion about axes which are transverse to the longitudinal axis, and bevel gears to transform the rotary motion about the transverse axes into rotary motion about the longitudinal axis or one or more axes parallel to the longitudinal axis. A plurality of gear trains are employed in parallel relation in order to divide the load to reduce the unit stress of the gear teeth and to balance out certain undesirable forces. The shafts upon which the gear trains are mounted are supported and housed by a framework, hereinafter described, which is particularly well adapted for the purpose.

Reference may now be had to the drawings for a more complete disclosure of this invention. In order to explain the operation of the device to better advantage the gear trains and then the framework for supporting and housing the gear trains will be described.

The gear trains include a longitudinally extending drive shaft 10 having a drive sheave 11 mounted on one end, which may be termed the inner end, and a worm 12 fastened to the shaft near its other or outer end.

Two or more opposed worm gears 13 mounted on transverse shafts 14 mesh with the worm 12 and are therefore rotated about axes transverse to the axis of rotation of the drive shaft 10.

Pinions 15, which are mounted on the shaft 14 in fixed relation to the worm gears 13, drive spur gears 16 which also rotate about axes which are transverse to the longitudinal axis of the shaft 10. The spur gears 16 are preferably die cast or shrunk on extensions of bevel gears 17 and the bevel gears are mounted for rotation on the stub shafts 18. The bevel gears 17 have opposed, and thereby balanced, meshing engagement with a bevel gear 19 whose axis is substantially concentric with the axis of the drive shaft 10. The shaft 21, on which the bevel gear 19 is fastened, and which may be termed an intermediate driven shaft, is supported in a bearing in plate or disk 36 which is a part of the framework hereinafter described and is not journaled on the shaft 10. The axis of rotation of shaft 21 is, of course, substantially coincident with the axis of rotation of the shaft 10.

A pinion gear 22 is fastened to the other end of the shaft 21. A plurality of spur gears 23 mounted for rotation on shafts 20 which are parallel to shaft 21 are in mesh with the pinion gear 22 and thus serve to translate the motion of rotation of the intermediate driven shaft 21 about the longitudinal axis of the hoist into motion about axes which are parallel to the longitudinal axis. Pinion gears 24 which are mounted for rotation on the same shafts 20 as the spur gears being shown as formed integral with the gears 23 to turn therewith, serve to drive a cup-shaped driven member 25 by means of the internal teeth 26 on the cup-shaped member, with which the teeth of the gears 24 mesh.

The cup-shaped member 25 is provided with an internally splined opening 27 at its center in which the shaft portion 31 of the driven sheave 28 is splined, and the inner end of the drive shaft 10 is journaled in the shaft 31. The transverse position or location of the inner end of the drive shaft 10 is thus determined by the cup-shaped driven member 25, whose position in turn is located by the gears 24 which are journaled for rotation on shafts 20, which are secured in the hereinafter described discs 35 and 36. The drive shaft 10 is therefore relatively free to align itself with respect to the driven member and may be said to be "self-aligning" or "floating" with respect to it to minimize binding or friction between the driving and driven members.

Both the drive sheave 11 and driven sheave 28 may be provided with annular grooves 29 and depressed portions 30 to accommodate, respectively, a drive chain and driven chain as is well known in the art. The driven chain may be looped over the driven sheave with both ends hanging freely or may have its free end attached to the housing of the hoist. If desired, the drive sheave may be eliminated and the shaft 10 driven by means of a motor mounted adjacent the free end of the shaft, supported from the same structure which supports the hoist.

The framework for supporting the gear trains preferably includes a large main frame member or disc 35 having a plurality of openings 37 at its periphery to which a cover (not shown), and a structure such as a hook 37a or supporting framework may be engaged. The disc is provided with lugs or bosses 39 to which a stationary secondary frame member or disc 36 is attached in spaced relation. A cup-shaped annular flange 41 on disc 35 affords bearings for engaging one end of each of the plurality of shafts 20 on which the spur gears 23 and gears 24 are rotatably mounted, the other ends of the shafts 20 being secured in the secondary disc 36.

The secondary disc 36 is preferably comprised of two half discs one of which has an integral longitudinally extending plate 43 and the other half disc has an integral longitudinal extending complementary plate 44. The half discs have integral hollow marginal lugs 45 and 46, and bolts 47 are passed through these lugs to hold the U-frame, formed by the half discs constituting the disc 36 and plates 43 and 44, together. The lugs 48 at the outer end of each plate are joined together by bolts 50 to form a web or base 49 to which a thrust bearing plate 51 may be secured. The web is adapted to support a radial bearing 52 for the outer end of the longitudinal extending drive shaft 10.

The thrust bearing may be of any suitable construction but preferably utilizes a collar 54 mounted on shaft 10 and bearing against the worm 12 and is constructed as follows. An anti-friction thrust bearing 55 is located on the shaft 10 adjacent the collar 54 with its central race bearing against the collar and its outer race bearing against a pair of washers 56 which in turn bear against the stationary race of the radial bearing 52 which in turn is supported in web 49 and bears against plate 51. A second anti-friction thrust bearing 57 is located outside of the web 49 with one race bearing against the web and the other against a nut 58 which is threaded on the shaft 10.

Plates 43 and 44 are provided with outwardly extending bosses 59 which form bearings for the shafts 14 on which the worm gears 13, and spur gears 15 are mounted and with bosses 60 for engaging and supporting the stub shafts 18 on which spur gears 16 and bevel gears 17 are rotatably mounted. The secondary disc 36 and plates 43 and 44 are preferably symmetrical to be interchangeable.

It is to be noted that the drive shaft 10, the intermediate driven shaft 21, the cup-shaped driven member 25 and the driven sheave 28 are the only members which carry the full driving torque or force. The driving force at these members is pure torque and therefore, since the shearing strength of the material is high, large parts need not be used. The diameter of the drive shaft 10 is less than the diameter of the driven members 25 and 28 and this relative location and arrangement has been chosen because the speed of the drive shaft 10 is considerably greater than the speed of the driven members and therefore the torque is considerably less.

Although a single gear train may be employed between the drive shaft and the driven members, I prefer to utilize two or more gear trains in parallel relation, in order to lower the unit stress at the gear teeth thus permitting the use, if desired, of inexpensive gears. I prefer to utilize a plurality of gear trains also in order to balance out certain undesirable lateral forces acting between the drive shaft and the gear train and in order to provide for self alignment of the parts of the the gear train.

For instance, at the worm 12 I prefer to utilize a pair of opposed worm gears 13 so that the force acting between the worm and one worm gear is balanced by a force acting between the opposed worm gear and the worm. In the present embodiment of the invention I have preferred to utilize two like gear trains between the drive shaft and the intermediate driven shaft 21. The relative speed of the gearing in this portion of the drive is high so that the stresses encountered are relatively low and therefore two parallel gear trains are sufficient for the purpose. However, it is quite apparent that three or more gear trains rotating in planes radial to the axis of the drive shaft 10 might be employed and the worm gears might be located so that forces acting between the worm and the worm gears would be balanced out.

This same balancing action for rotating the intermediate shaft 21 is employed by utilizing two or more bevel gears 17 to rotate the bevel gear 19.

As the speed of rotation of the gearing between the intermediate driven shaft 21 and the end driven members 25 and 28 is relatively low thereby resulting in a high torque I prefer to utilize three sets of gears in this portion of the gearing. It is quite apparent that only one or two sets of gearing might be employed. If one or two sets of gearing were employed it would probably be necessary to employ some other means of mounting the driven members 25 and 28 and the unit stress at the gear teeth would be higher.

On the other hand four or more gear trains acting in parallel relation might be employed. It is apparent, therefore, that the invention contemplates the use of a plurality of gear trains located and acting in parallel relation between the driving and the driven members, the number of trains employed depending on the unit stress at the gear teeth and the desirability of balancing out undesirable forces.

It is to be noted also that the driven member is close to the axis of the hoist and that the driving and driven members rotate about a longitudinally extending axis of the hoist whereby a compact, simple, effective and reliable organization of the parts of the hoist is effected. The load is divided between two or more sets of gearing so that the loading per unit area of cross section of the gear teeth is relatively low.

Having thus described the invention, what is claimed as new and desired to be secured by Letters Patent is:

1. In a hoist mechanism, a framework comprising a main transversely disposed frame member, a secondary frame member having a transversely disposed base generally parallel the main frame member and longitudinally extending side portions, and a gear train comprising gearing rotatable about transverse axes between the side portions of said secondary frame member on one side of the base of the secondary frame member, and other gearing rotatable about longitudinally extending axes on the other side of the transversely disposed base of the secondary frame member and between said transversely disposed base and the main frame member.

2. In a device of the class described the combination of a worm drive, a drive member directly connected therewith, a driven member, an intermediate bevel gear drive, a spur gear drive connection between said worm drive and said intermediate bevel gear drive, and a spur gear drive connecting the intermediate bevel gear drive and said driven member.

3. In a device of the class described the combination of a worm drive, a drive member directly connected therewith, a driven member, an intermediate bevel gear drive, a spur gear drive connection between said worm drive and said intermediate bevel gear drive, and a spur gear drive connecting the intermediate bevel gear drive and said driven member, said drive member and said driven member being coaxial and said intermediate bevel gear drive including a bevel gear coaxial with said drive and driven members, and connected to a spur gear forming a part of the spur gear drive between the intermediate bevel gear drive and the driven member.

4. In a speed changing mechanism, a drive shaft, a driven member, a worm on the drive shaft, a pair of diametrically opposed worm gears engaged with the worm, a plurality of small spur gears one of which is attached to each worm gear, a plurality of larger spur gears one of which is geared to each of the small spur gears, a plurality of bevel gears one of which is attached to each of the large spur gears, a bevel gear geared to the bevel gears, a member concentric with the drive shaft, upon which the last named bevel gear is secured at one end thereof, a spur gear on the other end of the last named member, a plurality of spur gears radially disposed with regard to and engaging the last named gear, a plurality of spur gears attached to the last named spur gear and an internal gear engaging said last mentioned plurality of spur gears and connected to the driven member.

5. In a hoist mechanism, coaxial drive and driven members, a worm drive having direct connection with the drive member at the drive end of the hoist mechanism, a ratio drive comprising a plurality of spur gears rotatable about axes parallel the axis of the drive member and having ratio connection directly with said driven member at the driven end of the hoist mechanism, and means connecting said worm drive at the drive end of the hoist mechanism with the spur gears at the driven end of said mechanism, said last means including bevel gears operatively connected between the worm drive and the spur gears rotatable about axes parallel with the axis of the drive member.

6. In a hoist mechanism, coaxial drive and driven members, a worm drive having direct connection with the drive member at the drive end of the hoist mechanism, a ratio drive comprising a plurality of spur gears rotatable about axes parallel the axis of the drive member and having ratio connection directly with said driven member at the driven end of the hoist mechanism, means connecting said worm drive at the drive end of the hoist mechanism with the spur gears at the driven end of said mechanism, said last means including bevel gears operatively connected between the worm drive and the spur gears rotatable about axes parallel with the axis of the driven member, and spur gears between the worm drive and said bevel gears and between the bevel gears and the gears rotatable about axes parallel with the axis of the drive member.

7. In combination, a drive member, a driven member coaxial therewith, a ring gear on said driven member, an intermediate driven member coaxial with said first driven member, a bevel gear and pinion on said intermediate driven member, a plurality of spur gears rotatable about axes parallel with the axis of said driven member and meshing with the pinion on the intermediate member and with the ring gear on the driven member, a pair of driving bevel gears meshing with the bevel gear on the intermediate driven member at diametrically opposite sides thereof, a worm on the drive member, a pair of worm wheels meshing with the worm at diametrically opposite sides thereof, spur gears coaxial with said worm wheels and driven thereby, and spur gears coaxial with and driving said driving bevel gears and meshing with the spur gears coaxial with the worm wheels.

8. In a device of the class described, a drive shaft, a driven member coaxial with said drive shaft, a drive sheave on the drive shaft, a driven sheave on the driven member and disposed adjacent said drive sheave, a reduction mechanism disposed wholly to one side of both said sheaves and comprising a balanced worm drive having a direct connection with the drive shaft, an internal gear having connection with the driven member, a plurality of spur gears rotatable about axes parallel to the axis of the drive shaft and including spur pinions meshing with said internal gear, and a combination spur gear and bevel gear connection between the worm drive and said spur gears and including a spur gear member coaxial with said drive shaft and meshing with said first spur gears.

In witness whereof, I hereunto subscribe my name this 7th day of Feb., 1931.

EARL E. McCOLLUM.